United States Patent
Howard et al.

(10) Patent No.: US 10,846,601 B1
(45) Date of Patent: Nov. 24, 2020

(54) SENTIC NEURONS: EXPANDING INTENTION AWARENESS

(71) Applicants: Newton Howard, Providence, RI (US); Erik Cambria, Arlington, VA (US)

(72) Inventors: Newton Howard, Providence, RI (US); Erik Cambria, Arlington, VA (US)

(*) Notice: Subject to any disclaimer, the term of this patent is extended or adjusted under 35 U.S.C. 154(b) by 785 days.

(21) Appl. No.: 15/272,995

(22) Filed: Sep. 22, 2016

Related U.S. Application Data

(60) Provisional application No. 62/222,096, filed on Sep. 22, 2015.

(51) Int. Cl.
*G06N 5/00* (2006.01)
*G06N 5/04* (2006.01)
*G06N 7/00* (2006.01)

(52) U.S. Cl.
CPC .............. *G06N 5/04* (2013.01); *G06N 7/005* (2013.01)

(58) Field of Classification Search
CPC ........... G06N 5/04; G06N 7/005; G06F 15/16
USPC .......................................................... 706/55
See application file for complete search history.

(56) References Cited

U.S. PATENT DOCUMENTS

| | | | | |
|---|---|---|---|---|
| 8,145,474 | B1* | 3/2012 | Daily | G06N 5/003 704/9 |
| 2010/0055655 | A1* | 3/2010 | Ashman, Jr. | G09B 7/02 434/236 |
| 2012/0016267 | A1* | 1/2012 | Campbell | A61B 5/1172 600/587 |
| 2013/0344464 | A1* | 12/2013 | Mychals | G09B 19/00 434/236 |
| 2014/0046891 | A1* | 2/2014 | Banas | G06N 5/022 706/46 |

(Continued)

OTHER PUBLICATIONS

Cambria, Erik, et al. "Sentic blending: Scalable multimodal fusion for the continuous interpretation of semantics and sentics." 2013 IEEE symposium on computational intelligence for human-like intelligence (CIHLI). IEEE, 2013. (Year: 2013).*

(Continued)

*Primary Examiner* — Hien D Khuu
(74) *Attorney, Agent, or Firm* — Smith, Gambrell & Russell, LLP

(57) ABSTRACT

Embodiments of the present invention may provide techniques to create a new framework by this invention applying the theory of Sentic Computing. For example, in an embodiment of the present invention, a computer-implemented method for data analysis may comprise receiving input data representing circumstantial semantics, processing the received input data representing circumstantial semantics with Intention Awareness processing, receiving input data representing conceptual and affective information associated with objects and actors of the operating environment, processing the received input data representing conceptual and affective information associated with objects and actors of the operating environment with Sentic Computing, generating a mapping of the Intention Awareness processing data to a first multi-dimensional coordinate vector, generating a mapping of the Sentic Computing processed data to a second multi-dimensional coordinate vector, and generating output data by fusing the first vector and the second vector over time.

12 Claims, 4 Drawing Sheets

(56) References Cited

U.S. PATENT DOCUMENTS

2014/0164313 A1* 6/2014 Alboszta .............. G06N 7/005
706/52

OTHER PUBLICATIONS

Howard, Newton, and Erik Cambria. "Intention awareness: improving upon situation awareness in human-centric environments." Human-centric Computing and Information Sciences 3.1 (2013): 9. (Year: 2013).*
Howard, Newton. "Application of intention awareness and sentic computing for sensemaking in joint-cognitive systems." 2013 IEEE Symposium on Intelligent Agents (IA). IEEE, 2013. (Year: 2013).*
Cambria, Erik and Amir Hussain. "Sentic Computing: Techniques, Tools, and Applications." (2012).
Cambria, E., Benson, T., Eckl, C., Hussain, A.: Sentic PROMs: Application of sentic computing to the development of a novel unified framework for measuring health-care quality. Expert Systems with Applications 39(12), 10,533-10,543 (2012).
Cambria, E., Chandra, P., Sharma, A., Hussain, A.: Do not feel the trolls. In: ISWC. Shanghai (2010).
Cambria, E., Grassi, M., Hussain, A., Havasi, C.: Sentic computing for social media marketing. Multimedia Tools and Applications 59(2), 557-577 (2012).
Cambria, E., Havasi, C., Hussain, A.: SenticNet 2: A semantic and affective resource for opinion mining and sentiment analysis. In: FLAIRS, pp. 202-207. Marco Island (2012).
Cambria, E., Hupont, I., Hussain, A., Cerezo, E., Baldassarri, S.: Sentic avatar: Multimodal affective conversational agent with common sense. In: A. Esposito, A. Hussain, M. Faundez-Zanuy, R. Martone, N. Melone (eds.) Toward Autonomous, Adaptive, and Context-Aware Multimodal Interfaces: Theoretical and Practical Issues, Lecture Notes in Computer Science, vol. 6456, pp. 82-96. Springer-Verlag, Berlin Heidelberg (2011).
Cambria, E., Hussain, A.: Sentic album: Content-, concept-, and context-based online personal photo management system. Cognitive Computation 4(4), 477-496 (2012).
Cambria, E., Hussain, A., Eckl, C.: Bridging the gap between structured and unstructured health-care data through semantics and sentics. In: WebSci. Koblenz (2011).
Cambria, E., Hussain, A., Eckl, C.: Taking refuge in your personal sentic corner. In: IJCNLP, pp. 35-43. Chiang Mai (2011).
Cambria, E., Hussain, A., Havasi, C., Eckl, C: AffectiveSpace: Blending common sense and affective knowledge to perform emotive reasoning. In: CAEPIA, pp. 32-41. Seville (2009).
Cambria, E., Hussain, A., Havasi, C., Eckl, C.: Common sense computing: From the society of mind to digital intuition and beyond. In: J. Fierrez, J. Ortega, A. Esposito, A. Drygajlo, M. Faundez-Zanuy (eds.) Biometric ID Management and Multimodal Communication, Lecture Notes in Computer Science, vol. 5707, pp. 252-259. Springer, Berlin Heidelberg (2009).
Cambria, E., Hussain, A., Havasi, C., Eckl, C., Munro, J.: Towards crowd validation of the UK national health service. In: WebSci. Raleigh (2010).
Cambria, E., Livingstone, A., Hussain, A.: The hourglass of emotions. In: A. Esposito, A. Vinciarelli, R. Hoffmann, V. Muller (eds.) Cognitive Behavioral Systems, Lecture Notes in Computer Science, vol. 7403, pp. 144-157. Springer, Berlin Heidelberg (2012).
Cambria, E., Mazzocco, T., Hussain, A., Eckl, C.: Sentic medoids: Organizing affective common sense knowledge in a multi-dimensional vector space. In: D. Liu, H. Zhang, M. Polycarpou, C. Alippi, H. He (eds.) Advances in Neural Networks, Lecture Notes in Computer Science, vol. 6677, pp. 601-610. Springer-Verlag, Berlin (2011).
Cambria, E., Olsher, D., Kwok, K.: Sentic activation: A two-level affective common sense reasoning framework. In: AAAI, pp. 186-192. Toronto (2012).
Cambria, E., Olsher, D., Kwok, K.: Sentic panalogy: Swapping affective common sense reasoning strategies and foci. In: CogSci, pp. 174-179. Sapporo (2012).
Cambria, E., Song, Y., Wang, H., Hussain, A.: Isanette: A common and common sense knowledge base for opinion mining. In: ICDM, pp. 315-322. Vancouver (2011).
Cambria, E., Speer, R., Havasi, C., Hussain, A.: SenticNet: A publicly available semantic resource for opinion mining. In: AAAI CSK, pp. 14-18. Arlington (2010).
Cambria, E., Xia, Y., Hussain, A.: Affective common sense knowledge acquisition for sentiment analysis. In: LREC, pp. 3580-3585. Istanbul (2012).
Chandra, P., Cambria, E., Hussain, A.: Clustering social networks using interaction semantics and sentics. In: J.Wang, G. Yen, M. Polycarpou (eds.) Advances in Neural Networks, Lecture Notes in Computer Science, vol. 7367, pp. 379-385. Springer, Heidelberg (2012).
Shandra, P., Cambria, E., Pradeep, A.: Enriching social communication through semantics and sentics. In: IJCNLP, pp. 68-72. Chiang Mai (2011).
Grassi, M., Cambria, E., Hussain, A., Piazza, F.: Sentic web: A new paradigm for managing social media affective information. Cognitive Computation 3(3), 480-489 (2011).
Hupont, L., Cambria, E., Cerezo, E., Hussain, A., Baldassarri, S.: Sentic maxine: Multimodal affective fusion and emotional paths. In: J. Wang, G. Yen, M. Polycarpou (eds.) Advances in Neural Networks, Lecture Notes in Computer Science, vol. 7368, pp. 555-565. Springer, Heidelberg (2012).
Leoncini, A., Sangiacomo, F., Peretti, C., Argentesi, S., Zunino, R., Cambria, E.: Semantic models for style-based text clustering. In: IEEE ICSC. Palo Alto (2011).

* cited by examiner

SENTIC NEURONS: EXPANDING INTENTION AWARENESS

BACKGROUND

The present invention incorporates recent insight into personality type, sentiment analysis, and intentionality to provide a novel computational means of predicting behavior and better understanding it. Our proposed system will exploit the high volume of publicly available, human-generated social media data by using it to perform classification based on known personality types. Coupled with a unique intent-based analysis engine, this system also promises to yield a more complete individual cognitive picture than any existing system, and can be used both in the diagnosis and evaluation of psychiatric disorders as well as the prediction of a person's behavior.

One of the major obstacles to effective behavioral analysis is the difficulty in distinguishing which actions and thoughts are attributable to an individual's personality type, and which are attributable to his/her mind state at the time that the action takes place. For instance, a physical altercation involving an individual with a history of aggressive behavior and rhetoric is fundamentally different from a sudden violent outburst from somebody with a more docile behavioral history. In the latter case, it is necessary both to examine the situational and individual factors that contributed directly to the event, as well as the underlying cognitive phenomena that may have been set in motion long beforehand. In order to separate these modes of analysis effectively and make proper use of their results, a novel conceptual framework that combines data collection and analytical methodology is needed.

SUMMARY

Embodiments of the present invention may provide techniques to create this new framework by this invention applying the theory of Sentic Computing. The fundamental precept of Sentic Computing is that, in envisioning intelligence, concepts are inextricably bound with feelings. That is, a concept may present a cognitive stimulus, but the reaction (or response) to that stimulus can involve any number of emotional states: anger (evolved for reaction), fear as a means of self-preservation, or affection. Thus, if these emotions contribute to the human mind state and are a prerequisite for understanding intelligence in the same way as intentions, then it is important to understand how each of these cognitive phenomena interacts with the other. Further, in embodiments, Intention Awareness (IA) and Sentic Computing may be combined.

For example, in an embodiment of the present invention, a computer-implemented method for data analysis may comprise receiving input data representing circumstantial semantics, processing the received input data representing circumstantial semantics with Intention Awareness processing, receiving input data representing conceptual and affective information associated with objects and actors of the operating environment, processing the received input data representing conceptual and affective information associated with objects and actors of the operating environment with Sentic Computing, generating a mapping of the Intention Awareness processing data to a first multi-dimensional coordinate vector, generating a mapping of the Sentic Computing processed data to a second multi-dimensional coordinate vector, and generating output data by fusing the first vector and the second vector over time.

In an embodiment, components of each coordinate's vector may be calculated as a barycenter of each coordinate's vector's weighted points. The input data may comprise visual, auditory, and textual data. The visual data may comprise facial expressions that are used to determine sentiments, and wherein and tendencies over time are used to enhance personality analysis. The textual data may be processed by pre-processing the textual data, extracting concepts from the pre-processed data, inferring semantics associated with the extracted concepts, and extracting Sentic data from the inferred semantics.

In an embodiment of the present invention, a computer program product for data analysis may comprise a non-transitory computer readable storage having program instructions embodied therewith, the program instructions executable by a computer, to cause the computer to perform a method comprising receiving input data representing circumstantial semantics, processing the received input data representing circumstantial semantics with Intention Awareness processing, receiving input data representing conceptual and affective information associated with objects and actors of the operating environment, processing the received input data representing conceptual and affective information associated with objects and actors of the operating environment with Sentic Computing, generating a mapping of the Intention Awareness processing data to a first multi-dimensional coordinate vector, generating a mapping of the Sentic Computing processed data to a second multi-dimensional coordinate vector, and generating output data by fusing the first vector and the second vector over time.

In an embodiment of the present invention, a system for data analysis may comprise a processor, memory accessible by the processor, and computer program instructions stored in the memory and executable by the processor to perform receiving input data representing circumstantial semantics, processing the received input data representing circumstantial semantics with Intention Awareness processing, receiving input data representing conceptual and affective information associated with objects and actors of the operating environment, processing the received input data representing conceptual and affective information associated with objects and actors of the operating environment with Sentic Computing, generating a mapping of the Intention Awareness processing data to a first multi-dimensional coordinate vector, generating a mapping of the Sentic Computing processed data to a second multi-dimensional coordinate vector, and generating output data by fusing the first vector and the second vector over time.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
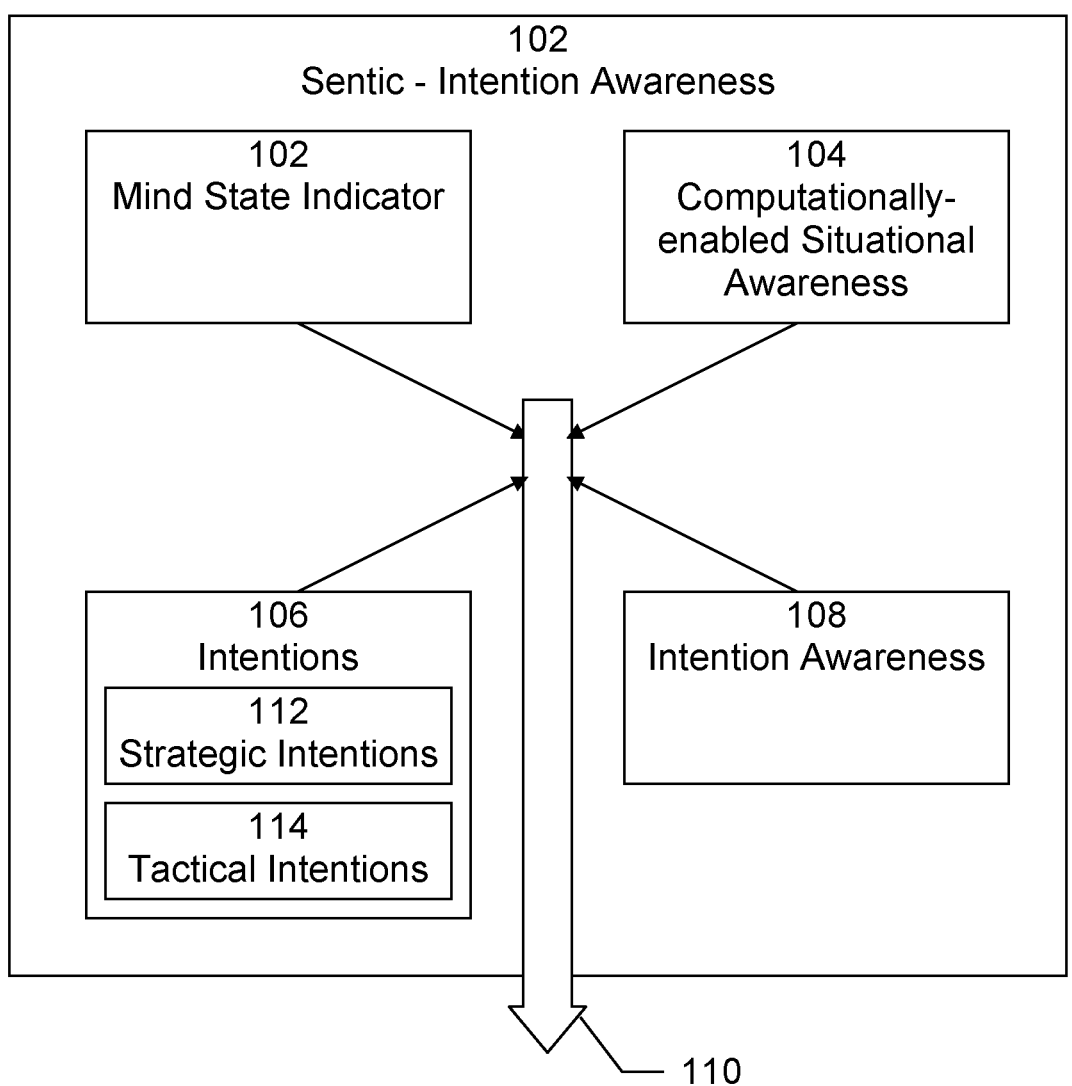
FIG. 1 is an exemplary block diagram of processing modules according to an embodiment of the present invention.

Embodiments of the present invention may provide techniques to create this new framework by this invention applying the theory of Sentic Computing. The fundamental precept of Sentic Computing is that, in envisioning intelligence, concepts are inextricably bound with feelings. That is, a concept may present a cognitive stimulus, but the reaction (or response) to that stimulus can involve any number of emotional states: anger (evolved for reaction), fear as a means of self-preservation, or affection. Thus, if these emotions contribute to the human mind state and are a prerequisite for understanding intelligence in the same way as intentions, then it is important to understand how each of these cognitive phenomena interacts with the other.

Sentic computing is a multi-disciplinary approach to opinion mining and sentiment analysis that involves the use of: Artificial Intelligence (AI) and Semantic Web techniques, for knowledge representation and inference; mathematics, for carrying out tasks such as graph mining and multi-dimensionality reduction; linguistics, for discourse analysis and pragmatics; psychology, for cognitive and affective modeling; sociology, for understanding social network dynamics and social influence; finally ethics, for understanding related issues about the nature of mind and the creation of emotional machines.

By parsing existing sets of personality and sentiment data, such as SenticNet, and deriving mind state from parts of speech, determining mean sentiment value, and identifying personality types based on specific metrics such as extroversion and conscientiousness, our approach promises to provide more faithful analysis across a broader range of characteristics and actions than present cognitive analytical tools. Ultimately, Sentic-IA will not be limited to the clinical realm. We envision several application areas, such as predictive analysis, in which Sentic-IA would be used to detect personality types, current mind state and intentionality based on diction and language use, as well as measure trust.

In prior published research, we have examined the ensemble application of Sentic computing and intention awareness techniques to evaluate the feasibility of developing a novel analysis framework for estimating the effects of diplomatic, informational, military, health, and economic activities in the context of a military theater of operations.

In particular, we were able to identify the following needs: (1) understanding and representing the underlying causality within the population; (2) formulating models that are both sensitive and computable; (3) validating the predictions of population beliefs, intentions, and behaviors by model. These requirements can be similarly mapped to the evaluation of individual actions and cognition. For instance, a Sentic-IA effort to diagnose and/or detect psychiatric disorders in an individual would seek situational causality (i.e., traumatic life events), data structures amenable to computational analysis, and comparison with existing evaluation data sets to ensure the validity of our conclusions.

Another central facet of our methodology is Intention Awareness (IA), hence the name Sentic-IA. Instead of modeling the environment based on objects and apparent attributes such as speed, direction, and numbers, IA exploits circumstantial semantics and Sentics, that is, the conceptual and affective information associated with objects and actors of the operating environment, and combines them with prior events to construct an event space from which human intentions can be inferred. The result is not entirely unlike enhanced SA, but due to its incorporation of human actor characteristics, it offers greater causal dimensionality.

Sentic-IA seeks to solve several yet-unaddressed issued in sentiment and cognitive analysis, and will ultimately be used for a number of applications, ranging from the disambiguation of vocal input to the improvement of human-machine interfaces and the construction of new models for cognitive disorders and cognitive profiling. Specifically, we can use Sentic-IA personality analysis to determine optimal user interface experience, including information presentation and fetching, as is used in search engines and data mining applications. Given sufficient data-richness, Sentic-IA can also be used to detect the onset of psychiatric and psychological disorders, such as PTSD by identifying personality types as risk factors, and then comparing with mind state tendency over the last n years). Using MSI-based analysis of mind state, as well as Sentic/MSI personality analysis Sentic-IA also promises to provide a new means to determine the quality of a person's intentions and use this information to construct a more fine-grained analysis of their behavior and cognitive patterns.

Based on prior published research about Intention Awareness and its spatiotemporal relationship with cognition, we hypothesize that we can extend our ability to predict and model intentions, which currently relies on mapping events and intentions to one another chronologically, by including Sentic-based analysis of these components as well as individuals.

Sentic-IA relies on a tripartite construction of the subject's overall condition, which includes personality type, present mind state, and the content of the interaction being analyzed. Personality type is derived from behavioral and rhetorical tendencies over long periods of time, but there are numerous other components that contribute to the Sentic-IA computational analysis engine.

As shown in the example in FIG. 1, Sentic-IA may include four modules 102, 104, 106, 108, six sets of input, and output data streams 110 formatted depending on the clinical or analytical needs that govern the application. Each of the modules corresponds to a hardware device specifically tailored to each subtask in the Sentic-IA routine. The first module is the Mind State Indicator (MSI) 102, which itself includes several sub-modules including data collection and analysis components. MSI 102 depends on voice, behavior, and written word data, so it is configurable to receive audio and raw instrument data as well (to include keyboard and behavior-monitoring instrumentation as well, such as multimodal Body Sensor Networks). The MSI algorithm itself explores the mapping of specific words and word contexts to "mind states," or cognitive dispositions influenced by emotions, situational stimuli, and pre-existing personality type. Mind states are transient as they depend for the most part on ever-changing variables, so this module's routine continues in a non-terminating loop until the analysis is complete.

In order to paint a clear picture of a patient's current state of mind, the analyst must examine their selection of words, their value, and the context in which they were used. In this sense, predictive linguistics is proactive instead of simply descriptive. Since language is the primary outward manifestation of our intentions (Howard, 2006) focusing our analysis on such attributes as these promises unprecedented real-time analysis of patient mind state that can then be used to identify brain disorders and proper treatments. A patient's conceptual expressions, both verbal and written, highlight underlying positive or negative language values over time, yielding a more accurate mind state analysis as time progresses (Giudere & Howard, 2011).

Computationally-enabled Situational Awareness 104. The situation assessment processes that comprises part of SA is an intensive cognitive process that serves as a junction between the physical properties of objects (position, heading, etc.) and the human mind's portrayal of those objects. In order to successfully complete this process, the actor conducting situational assessment must be able to properly account for the intentions of the other actors that share the same situation. This is a shortcoming in many contemporary SA models, which give less priority to intentionality as a driver of human-dominant situations [2, 5, 7]. Due to the inherent structural differences in situational data and intentional information, not all systems that address the latter can also address the former, which produces a significant implementation gap despite the conceptual and potential application overlap between SA and IA.

Intentions 106. Intentions are always realized through a plan-for-action that directly guides behavior. The intention's logical and spatial container includes this plan of action. Once troops are engaged in battle various knowledge layers of a plan-for-action may require change, alteration, or omission, while the intention will remain an invariant. In a Plan-System intention invariants manifest themselves in two distinctly different forms:

Strategic Intentions 112. Invariant in nature; Strategic Intentions specify the ultimate desired end-state condition of the mission overall and provide guidance and reference from which individuals construct their own tactical intentions. They provide a long-term invariant construct.

Tactical Intentions 114. Variant in nature, Tactical Intentions specify a single step in the process towards realization of the Strategic Intention; more ephemeral in content, Tactical Intentions occur on a localized scale and are edited or omitted as necessary during mission execution.

Strategic Intentions are directly deduced from the Commander's Intent and provide conceptualization of the end-state of the mission in general for all the actors involved in the mission. It is through the execution of smaller, more short-term and localized Tactical Intentions that the overall Strategic Intention is realized [13]. Differentiating between these two types of intention is necessary in light of a potentially different plan-for-action, which will realize the same Strategic Intention.

Strategic and Tactical Intentions relate to one another in an atomic formation. In the context of military organizations, CI travels through time and space within a combat order. As the primary invariant factor of a combat order, the CI therefore indicates a Strategic Intention. A variant knowledge layer of a combat order, the plan-for-action comprises the Concept of Operation, maneuvers, movements, objectives, fires, tasks, etc. The plan-for-action system thus indicates an atomic structure consisting of 1) a Strategic Intention and 2) transformations or relations of Tactical Intentions.

Intention Awareness 108. IA includes many of the basic principles of situation awareness (SA), such as consistent tracking and extrapolation of objects in the user's environment, but also exploits circumstantial semantics and Sentics [1], that is, the conceptual and affective information associated with objects and actors of the operating environment. Consider the everyday example discussed below.

Everyday tasks, from handling fragile objects to navigating a highway to parking one's car at work, require a high degree of situational awareness and spatial aptitude. Tasks such as these require the human actor to quickly adapt to new stationary and moving objects, as well as unpredictable moves that they may make, such as a pedestrian suddenly crossing the road. In the case of parking the car, the driver must account for the overall distribution of objects in the space of the parking lot at the time he plans to park the car, as well as the actions those objects may take based on the intentions of other human actors, hence the Parking Dilemma [2].

In order to properly understand and predict the actions of others in this space, the driver must predict what others will do, or their actions will otherwise appear random. For instance, a car may suddenly change course to move to a parking spot, which a driver considering the intentions of other drivers is more likely to detect and account for in his subsequent driving maneuvers.

Sentic Neurons—Existing approaches to opinion mining can be grouped into three main categories, with few exceptions: keyword spotting, lexical affinity, and statistical methods. Keyword spotting is the most naive approach and probably also the most popular because of its accessibility and economy. Text is classified into affect categories based on the presence of fairly unambiguous affect words like 'happy', 'sad', 'afraid', and 'bored'. Elliott's Affective Reasoner [4], for example, watches for 198 affect keywords, e.g., 'distressed' and 'enraged', plus affect intensity modifiers, e.g., 'extremely', 'somewhat', and 'mildly', plus a handful of cue phrases, e.g., 'did that' and 'wanted to'. Other popular sources of affect words are Ortony's Affective Lexicon [5], which groups terms into affective categories, and Wiebe's linguistic annotation scheme [6]. The weaknesses of this approach lie in two areas: poor recognition of affect when negation is involved and reliance on surface features. About its first weakness, while the approach can correctly classify the sentence "today was a happy day" as being happy, it is likely to fail on a sentence like "today wasn't a happy day at all". About its second weakness, the approach relies on the presence of obvious affect words which are only surface features of the prose. In practice, a lot of sentences convey affect through underlying meaning rather than affect adjectives. For example, the text "My husband just filed for divorce and he wants to take custody of my children away from me" certainly evokes strong emotions, but uses no affect keywords, and therefore, cannot be classified using a keyword spotting approach.

Lexical affinity is slightly more sophisticated than keyword spotting as, rather than simply detecting obvious affect words; it assigns arbitrary words a probabilistic 'affinity' for a particular emotion. For example, 'accident' might be assigned a 75% probability of being indicating a negative affect, as in 'car accident' or 'hurt by accident'. These probabilities are usually trained from linguistic corpora [7, 8, 9, 10]. Though often outperforming pure keyword spotting, there are two main problems with the approach. First, lexical affinity, operating solely on the word-level, can easily be tricked by sentences like "I avoided an accident" (negation) and "I met my girlfriend by accident" (other word senses). Second, lexical affinity probabilities are often biased toward text of a particular genre, dictated by the source of the linguistic corpora. This makes it difficult to develop a reusable, domain-independent model.

Statistical methods, such as latent semantic analysis (LSA) and support vector machine (SVM), have been popular for affect classification of texts and have been used by researchers on projects such as Goertzel's Webmind [11], Pang's movie review classifier [12], and many others [13, 14, 15, 16, 17]. By feeding a machine learning algorithm a large training corpus of affectively annotated texts, it is possible for the systems to not only learn the affective valence of affect keywords as in the keyword spotting approach, but such a system can also take into account the valence of other arbitrary keywords (like lexical affinity), punctuation, and word co-occurrence frequencies. However, statistical methods are generally semantically weak, meaning that, with the exception of obvious affect keywords, other lexical or co-occurrence elements in a statistical model have little predictive value individually. As a result, statistical text classifiers only work with acceptable accuracy when given a sufficiently large text input. So, while these methods may be able to affectively classify user's text on the page or paragraph level, they do not work well on smaller text units such as sentences.

Our proposed alternative approach aims to focus on emulating the human reasoning process. The motivation is to enable machines to represent knowledge and perform reasoning in many different ways so that, whenever they reach a dead end, they can switch among different points of view and find one that may work. To bridge the cognitive and affective gap between 'word-level' natural language data and the 'concept-level' opinions and sentiments conveyed by them, we need more intelligent cognitive systems able to learn new affective common sense knowledge and perform reasoning on it [18].

While cars and other motor vehicles possess functions, such as turn signals, to assist in the conveyance of the driver's intention to other drivers, there still remains a significant gap between a driver's intentions and other drivers' awareness of them. Due to finite time and resources, routine activities such as this require integrating not only Situational Awareness, but Intention Awareness, in order to optimize the exchange of those resources for some other reward, in the above example a parking space.

Sentic Neurons IA: producing a superior picture of individual intentions and mind state—This invention combines the concepts of Intention Awareness and Sentic computing as a means of improving the efficiency of human-machine interfaces, as well as improving current predictive analysis technologies to better account for human actors' motives and rationales for behavior. Fundamentally speaking, Sentic computing is a multi-disciplinary methodology for mining data on people's opinions and sentiments, and then analyzing them. Sentic computing uses AI and Semantic Web techniques to represent knowledge, graph mining to reduce problem dimensions, linguistics for discourse analysis and psychology for cognitive and affective analysis, among other fields that vary according to the nature of the problem. Sentic computing is specifically oriented to web applications, which are inherently data rich, but this invention incorporates several components of mind state analysis that focus on the individual's cognitive state.

The analysis of natural language is based on affective ontologies and common sense reasoning tools, which enable the analysis of text not only at document-, page- or paragraph-level, but also at sentence-, clause-, and concept-level. In particular, Sentic computing involves the use of AI and Semantic Web techniques, for knowledge representation and inference; mathematics, for carrying out tasks such as graph mining and multi-dimensionality reduction; linguistics, for discourse analysis and pragmatics; psychology, for cognitive and affective modeling; sociology, for understanding social network dynamics and social influence; finally ethics, for understanding related issues about the nature of mind and the creation of emotional machines.

Figure 2:
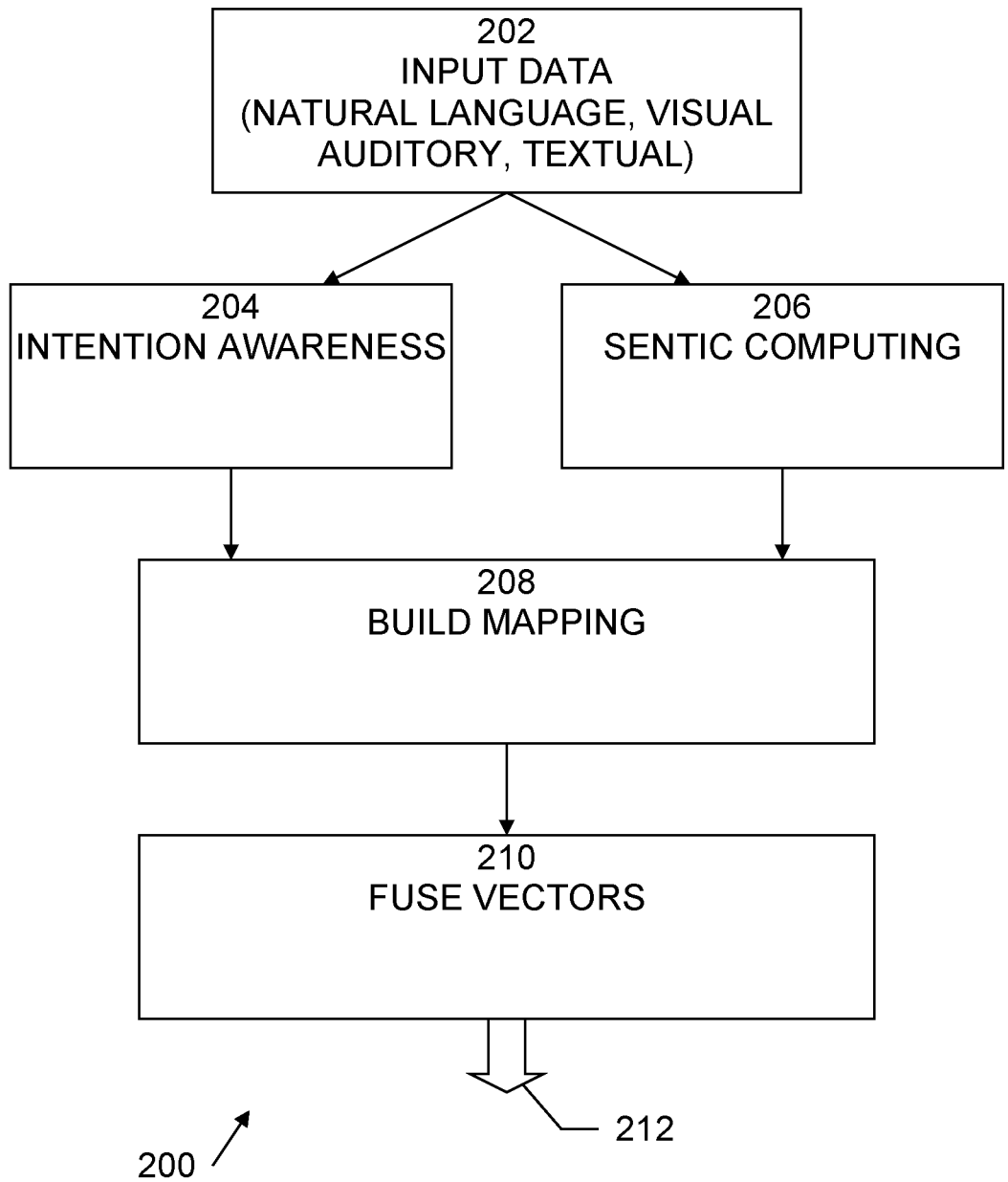
FIG. 2 is an exemplary flow diagram of a process according to an embodiment of the present invention.

In order to successfully combine the IA and Sentic computing concepts into an analytical template that is amenable to computational analysis, data streams associated with each must be "blended" in a useful manner. An exemplary flow diagram of a process 200 according to an embodiment of the present invention is shown in FIG. 2. Process 200 begins with 202, in which input data streams, which may include, for example, natural language, visual, auditory and textual data, and others, are received. At 204, at least of portion of the input data stream may be processed by IA 204 and by Sentic Computing 206.

To that end, Sentic blending proposes a methodology for fusing multiple unimodal signals in order to obtain a global multidimensional dynamic stream that shows how semantics and Sentics evolve over time. Capturing these changes over time is critical to the mission of Sentic-IA, which seeks to enhance existing implementations of IA by accounting for longer-term, subtle personality traits that do not change as often as mind state.

At 208, a mapping may be built such that the output of each module at a given time can be represented as, for example, a 100-dimensional coordinate vector. The components of the coordinate's vector are then calculated as the barycenter of those weighted points. Hence, the user's cognitive and affective progress can be viewed as a point (corresponding to the location of a particular state in time t) moving through this space over time.

At 210, the ensemble stream 212 may be computed by fusing the different vectors obtained from each modality over time. The main difficulty in achieving multimodal fusion is related to the fact that t0i stimulus arrival times may be known a-priori or not, and may be very different for each module.

The data obtained and used for these blending processes include visual, auditory, and textual data. In the case of visual data, facial expressions can be used to determine sentiments, and tendencies over time can be used to enhance personality analysis. Sentic-IA uses a facial analysis engine that achieves an automatic classification of the shown facial expressions into discrete emotional categories. It is able to classify the user's emotion in terms of Ekman's six universal emotions (fear, sadness, joy, disgust, surprise, and anger) plus neutral, giving a membership confidence value to each emotional category. The face modeling selected as input for the facial expression analyzer follows a feature-based approach: the inputs are a set of facial distances and angles calculated from feature points of the mouth, eyebrows, and eyes. The system intelligently combines the outputs of five different classifiers simultaneously. In this way, the overall risk of making a poor selection with a given classifier for a given input is reduced.

Figure 3:
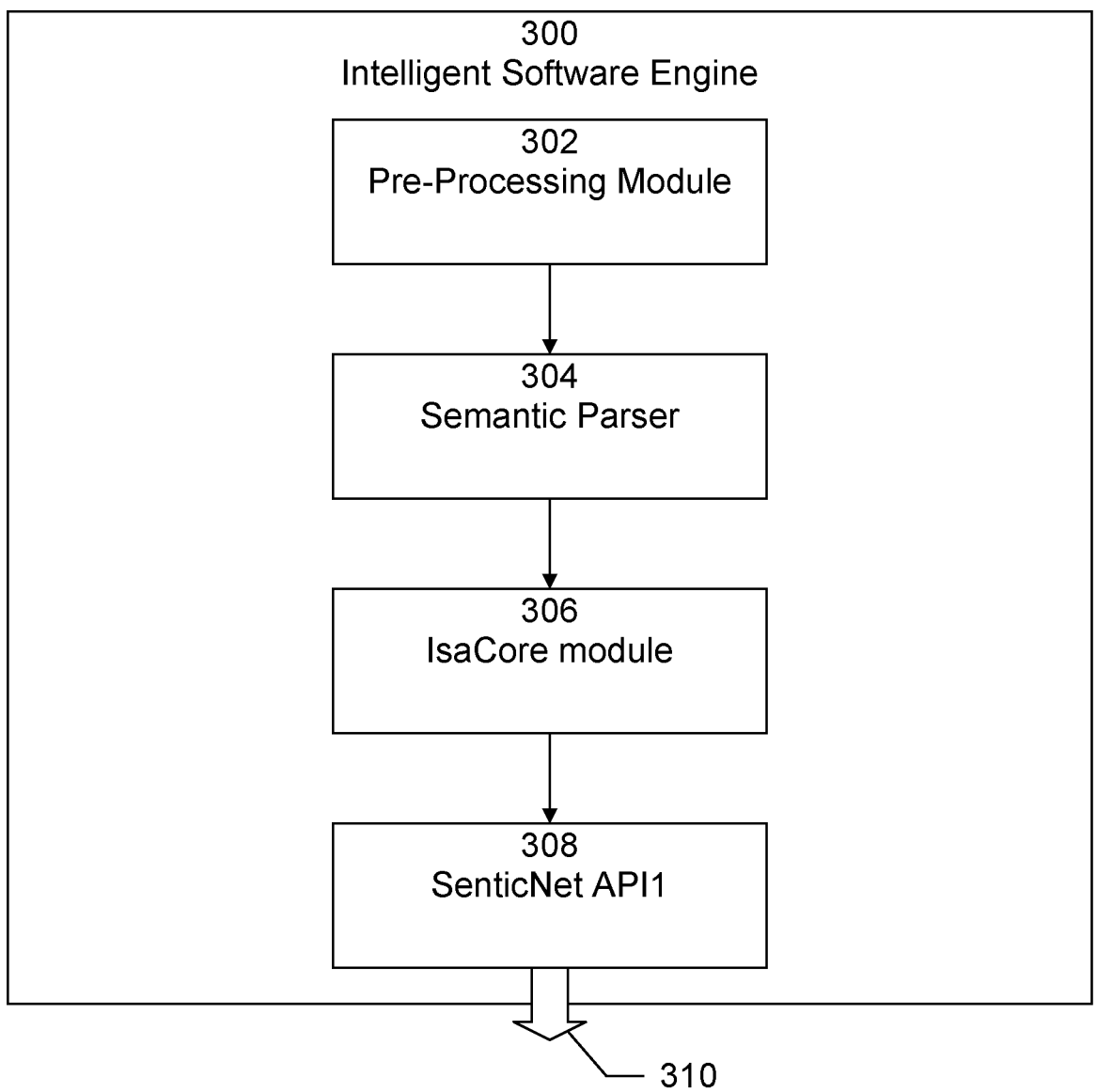
FIG. 3 is an exemplary block diagram of an intelligent software engine according to an embodiment of the present invention.

In the case of textual data, we have found that in order to effectively mine semantics and Sentics from text, it is necessary to bridge the gap between unstructured natural language data and structured machine-processable data. To this end, an intelligent software engine 300, an example of which is shown in FIG. 3, that may be based on SenticNet has been proposed that aims to extract the conceptual and affective information associated with natural language text. Intelligent software engine 300 may include four main components: a pre-processing module 302, which performs a first skim of the input text; a semantic parser 304, whose aim is to extract concepts from natural language data; the IsaCore module 306, for inferring the semantics associated with the given concepts; and the SenticNet API1 308, for the extraction of Sentics 310.

In prior research into personality types using the Facebook corpus, we found that Some Parts of Speech were significantly correlated with personality traits, including Extraversion ConceptNet and SenticNet produced a list of ~3600 concepts that occurred frequently in the Facebook Corpus. About ~150 correlated extremely highly with Extraversion, and some of the SenticNet vectors demonstrated significant correlations with individual traits, including Extraversion. The algorithm we developed showed an increased accuracy in the detection of extraversion and conscientiousness based on the ability to read text from Facebook posts and information.

Figure 4:
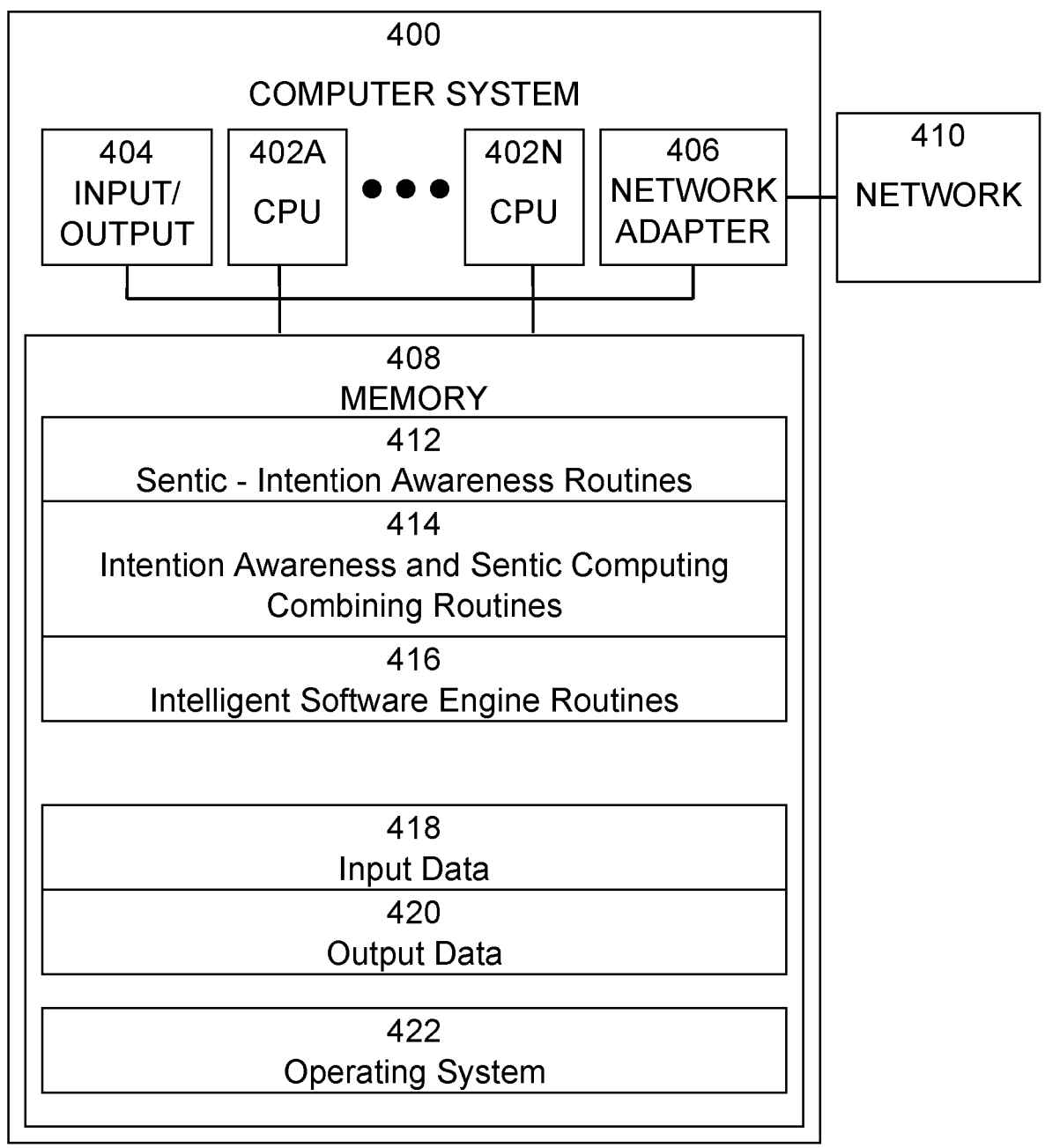
FIG. 4 is an exemplary block diagram of a computer system in which processes involved in the embodiments described herein may be implemented.

An exemplary block diagram of a computer system 400, in which processes involved in the embodiments described herein may be implemented, is shown in FIG. 4. Computer system 400 is typically a programmed general-purpose computer system, such as an embedded processor, system on a chip, personal computer, workstation, server system, and minicomputer or mainframe computer. Computer system 400 may include one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present invention also contemplates embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. For example, as shown in FIG. 1, computer systems may perform a variety of roles in the system, method, and computer program product described herein. For example, computer systems may perform one or more roles as end devices, gateways/base stations, application provider servers, and network servers. In the example shown in FIG. 4, exemplary memory contents are shown representing routines and data for all of these roles. However, one of skill in the art would recognize that these routines, along with the memory contents related to those routines, may not typically be included on one system or device, but rather are typically distributed among a plurality of systems or devices, based on well-known engineering considerations. The present invention contemplates any and all such arrangements.

In the example shown in FIG. 4, memory 408 may include Sentic—Intention Awareness routines 412, Intention Awareness and Sentic Computing Combining routines 414, Intelligent Software Engine routines 416, input data 418, output data 420, and operating system 422. For example, Sentic—Intention Awareness routines 412 may include routines to operate the hardware devices specifically tailored to each subtask in the Sentic—Intention Awareness shown in FIG. 1. Intention Awareness and Sentic Computing Combining 414 may include routines to combine the IA and Sentic computing concepts into an analytical template that is amenable to computational analysis by blending data streams or input data 418 associated with each and to output data 420, as shown in FIG. 2. Intelligent Software Engine routines 416 may include routines to implement an intelligent software engine, as shown in FIG. 3. Operating system 422 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for predicting and understanding behavior based on data relating to objects and actors in an operating environment, the method implemented in a computer system comprising a processor, memory accessible by the processor, and computer program instructions stored in the memory and executable by the processor, the method comprising: receiving input data including natural language, visual, auditory and textual data, and circumstantial semantics of the operating environment, wherein at least some of the data is received from behavior monitoring instrumentation; processing the received input data with Intention Awareness processing to find conceptual and affective information associated with the objects and actors of the operating environment, and to combine the conceptual and affective information with information relating to prior events to construct an event space from which human intentions can be inferred; processing the received input data with Sentic Computing processing by parsing sets of personality and sentiment data to derive mind state from the input data, determine mean sentiment value, and identify personality types based on metrics including extroversion and conscientiousness; generating a mapping of the Intention Awareness processed data to a first multi-dimensional coordinate vector; generating a mapping of the Sentic Computing processed data to a second multi-dimensional coordinate vector; and generating output data comprising a global multidimensional dynamic stream by fusing the first vector and the second vector over time, wherein the output data include a prediction of behavior of the objects and actors in the operating environment.

2. The method of claim 1, wherein components of each coordinate's vector are calculated as a barycenter of each coordinate's vector's weighted points.

3. The method of claim 1, wherein the visual data comprises facial expressions that are used to determine sentiments, and wherein tendencies over time are used to enhance personality analysis.

4. The method of claim 1, wherein the textual data is processed by:
   pre-processing the textual data;
   extracting concepts from the pre-processed data;
   inferring semantics associated with the extracted concepts; and
   extracting Sentic data from the inferred semantics.

5. A computer program product for predicting and understanding behavior based on data relating to objects and actors in an operating environment, the computer program product comprising a non-transitory computer readable storage having program instructions embodied therewith, the program instructions executable by a computer, to cause the computer to perform a method comprising: receiving input data including natural language, visual, auditory and textual data, and circumstantial semantics of the operating environment, wherein at least some of the data is received from behavior monitoring instrumentation; processing the received input data with Intention Awareness processing to find conceptual and affective information associated with the objects and actors of the operating environment, and to combine the conceptual and affective information with information relating to prior events to construct an event space from which human intentions can be inferred; processing the received input data with Sentic Computing processing by parsing sets of personality and sentiment data to derive mind state from the input data, determine mean sentiment value, and identify personality types based on metrics including extroversion and conscientiousness; generating a mapping of the Intention Awareness processed data to a first multi-dimensional coordinate vector; generating a mapping of the Sentic Computing processed data to a second multi-dimensional coordinate vector; and generating output data comprising a global multidimensional dynamic stream by fusing the first vector and the second vector over time, wherein the output data include a prediction of behavior of the objects and actors in the operating environment.

6. The computer program product of claim 5, wherein components of each coordinate's vector are calculated as a barycenter of each coordinate's vector's weighted points.

7. The computer program product of claim 5, wherein the visual data comprises facial expressions that are used to determine sentiments, and wherein tendencies over time are used to enhance personality analysis.

8. The computer program product of claim 5, wherein the textual data is processed by: pre-processing the textual data;
   extracting concepts from the pre-processed data;
   inferring semantics associated with the extracted concepts; and
   extracting Sentic data from the inferred semantics.

9. A system for predicting and understanding behavior based on data relating to objects and actors in an operating environment, the system comprising a processor, memory accessible by the processor, and computer program instructions stored in the memory and executable by the processor to perform: receiving input data including natural language, visual, auditory and textual data, and circumstantial semantics of the operating environment, wherein at least some of the data is received from behavior monitoring instrumentation; processing the received input data with Intention Awareness processing to find conceptual and affective information associated with the objects and actors of the operating environment, and to combine the conceptual and affective information with information relating to prior events to construct an event space from which human intentions can be inferred; processing the received input data with Sentic Computing processing by parsing sets of personality and sentiment data to derive mind state from the input data, determine mean sentiment value, and identify personality types based on metrics including extroversion and conscientiousness: generating a mapping of the Intention Awareness processed data to a first multi-dimensional coordinate vector; generating a mapping of the Sentic Computing processed data to a second multi-dimensional coordinate vector; and generating output data comprising a global multidimensional dynamic stream by fusing the first vector and the second vector over time, wherein the output data include a prediction of behavior of the objects and actors in the operating environment.

10. The system of claim 9, wherein components of each coordinate's vector are calculated as a barycenter of each coordinate's vector's weighted points.

11. The system of claim 9, wherein the visual data comprises facial expressions that are used to determine sentiments, and wherein tendencies over time are used to enhance personality analysis.

12. The system of claim 9, wherein the textual data is processed by:
   pre-processing the textual data;
   extracting concepts from the pre-processed data;
   inferring semantics associated with the extracted concepts; and
   extracting Sentic data from the inferred semantics.

* * * * *